(12) United States Patent
Chan et al.

(10) Patent No.: US 9,025,458 B2
(45) Date of Patent: May 5, 2015

(54) REDUCING CONGESTION OF MEDIA DELIVERY OVER A CONTENT DELIVERY NETWORK

(71) Applicant: Verizon Patent and Licensing, Inc., Basking Ridge, NJ (US)

(72) Inventors: Yee Sin Chan, San Jose, CA (US); Arda Aksu, Martinez, CA (US); Lin Sun, San Ramon, CA (US); Lalit R. Kotecha, San Ramon, CA (US); Jin Yang, Orinda, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 213 days.

(21) Appl. No.: 13/658,452

(22) Filed: Oct. 23, 2012

(65) Prior Publication Data
US 2014/0112140 A1    Apr. 24, 2014

(51) Int. Cl.
  *H04L 12/26* (2006.01)
  *H04L 12/24* (2006.01)
  *H04L 12/851* (2013.01)
  *H04L 12/823* (2013.01)
  *H04W 28/02* (2009.01)

(52) U.S. Cl.
  CPC .......... *H04L 41/5022* (2013.01); *H04L 43/16* (2013.01); *H04L 43/0882* (2013.01); *H04L 47/2433* (2013.01); *H04W 28/0289* (2013.01); *H04L 47/32* (2013.01); *H04L 41/0893* (2013.01)

(58) Field of Classification Search
  None
  See application file for complete search history.

(56) References Cited

U.S. PATENT DOCUMENTS

| | | | |
|---|---|---|---|
| 6,337,881 B1 * | 1/2002 | Chaddha | 375/240.16 |
| 6,459,698 B1 * | 10/2002 | Acharya | 370/392 |
| 6,498,865 B1 * | 12/2002 | Brailean et al. | 382/239 |
| 6,871,006 B1 * | 3/2005 | Oguz et al. | 386/346 |
| 7,460,558 B2 * | 12/2008 | Anand | 370/468 |
| 8,233,532 B2 * | 7/2012 | Wiegand et al. | 375/240.02 |
| 2003/0118107 A1 * | 6/2003 | Itakura et al. | 375/240.19 |
| 2004/0002364 A1 * | 1/2004 | Trikkonen et al. | 455/562.1 |
| 2005/0097213 A1 * | 5/2005 | Barrett et al. | 709/231 |
| 2006/0023748 A1 * | 2/2006 | Chandhok et al. | 370/469 |
| 2007/0115841 A1 * | 5/2007 | Taubman et al. | 370/252 |
| 2008/0177881 A1 * | 7/2008 | Endebrock et al. | 709/227 |
| 2008/0232251 A1 * | 9/2008 | Hirayama et al. | 370/235 |
| 2008/0304413 A1 * | 12/2008 | Briscoe et al. | 370/235 |
| 2009/0003270 A1 * | 1/2009 | Schwenke et al. | 370/329 |
| 2010/0199188 A1 * | 8/2010 | Abu-Hakima et al. | 715/733 |
| 2011/0019551 A1 * | 1/2011 | Adams et al. | 370/235 |
| 2011/0158187 A1 * | 6/2011 | Komamura et al. | 370/329 |
| 2011/0170408 A1 * | 7/2011 | Furbeck et al. | 370/230 |
| 2011/0299601 A1 * | 12/2011 | Lai et al. | 375/240.25 |
| 2012/0134260 A1 * | 5/2012 | Chou et al. | 370/225 |
| 2012/0278513 A1 * | 11/2012 | Prevost et al. | 710/39 |
| 2013/0067082 A1 * | 3/2013 | Khan | 709/225 |
| 2013/0149972 A1 * | 6/2013 | Luong et al. | 455/67.14 |
| 2013/0188484 A1 * | 7/2013 | Aksu et al. | 370/235 |
| 2013/0298170 A1 * | 11/2013 | ElArabawy et al. | 725/62 |
| 2013/0329559 A1 * | 12/2013 | Cabrera | 370/235 |
| 2014/0113631 A1 * | 4/2014 | Zhou et al. | 455/436 |

* cited by examiner

*Primary Examiner* — Bunjob Jaroenchonwanit

(57) ABSTRACT

A device may receive a packet that includes priority information that is based on a priority assigned to bits included in the packet. The priority may be assigned based on scalable code used to encode the bits for transmission. The device may determine that an indicator of network congestion satisfies a threshold, and may schedule the packet for transmission to a user device based on the priority information and the determination that the indicator satisfies the threshold.

20 Claims, 9 Drawing Sheets

REDUCING CONGESTION OF MEDIA DELIVERY OVER A CONTENT DELIVERY NETWORK

BACKGROUND

Content delivery networks may become congested due to a large number of users sending and receiving large amounts of traffic, such as audio or video traffic. This congestion may reduce the quality of a user's experience.

DETAILED DESCRIPTION OF PREFERRED EMBODIMENTS

The following detailed description of example implementations refers to the accompanying drawings. The same reference numbers in different drawings may identify the same or similar elements.

Content delivery networks may become congested due to a large number of users sending and receiving large amounts of traffic, such as audio or video traffic. This congestion may reduce the quality of a user's experience. The quality of a user's experience may be improved by decreasing the amount of traffic delivered over the content delivery network. In particular, devices in the content delivery network may prioritize packets to be delivered over a network, and a cellular network base station may drop low priority packets when the network is congested.

Congestion in a content delivery network may be due to transmission of video over the network (e.g., video streaming, videoconferencing, video telephony, video broadcasting, etc.). The video may be transmitted over the network as a bitstream, which may be compressed at a source device using an encoder, and which may be decompressed at a destination device, using a decoder, for the destination device to receive the transmitted video. For example, the video may be coded (e.g. encoded and/or decoded) using scalable code (e.g., via a scalable coder-decoder, or codec). Scalable code prioritizes the bits in the video bitstream.

Implementations described herein may reduce congestion in content delivery networks by prioritizing packets for transmission to user devices, and by dropping low priority packets. Devices in the network may prioritize the packets based on a priority used by a scalable coder when encoding the bits of a media stream carried by the packets.

A "packet," as used herein, may refer to a packet, a datagram, a cell, a fragment of a packet, a fragment of a datagram, a fragment of a cell, or any other type or arrangement of data that may be carried at a specified communication layer. A "media packet," as used herein, may refer to a packet that carries information associated with a media communication, such as an audio communication, a video communication, etc. A media packet may carry one or more bits of a media bitstream. The terms "bitstream" and "stream," as used herein, may refer to a sequence of bits, data, and/or information, such as a time series of bits. A "media bitstream" or "media stream," as used herein, may refer to a bitstream that carries media information, such as video or audio. The term "code," as used herein, may refer to a technique for encoding a bitstream for transmission and/or decoding a transmitted bitstream. For example, a code may be implemented using a codec (a coder-encoder) and/or an endec (encoder-decoder).

Figure 1:
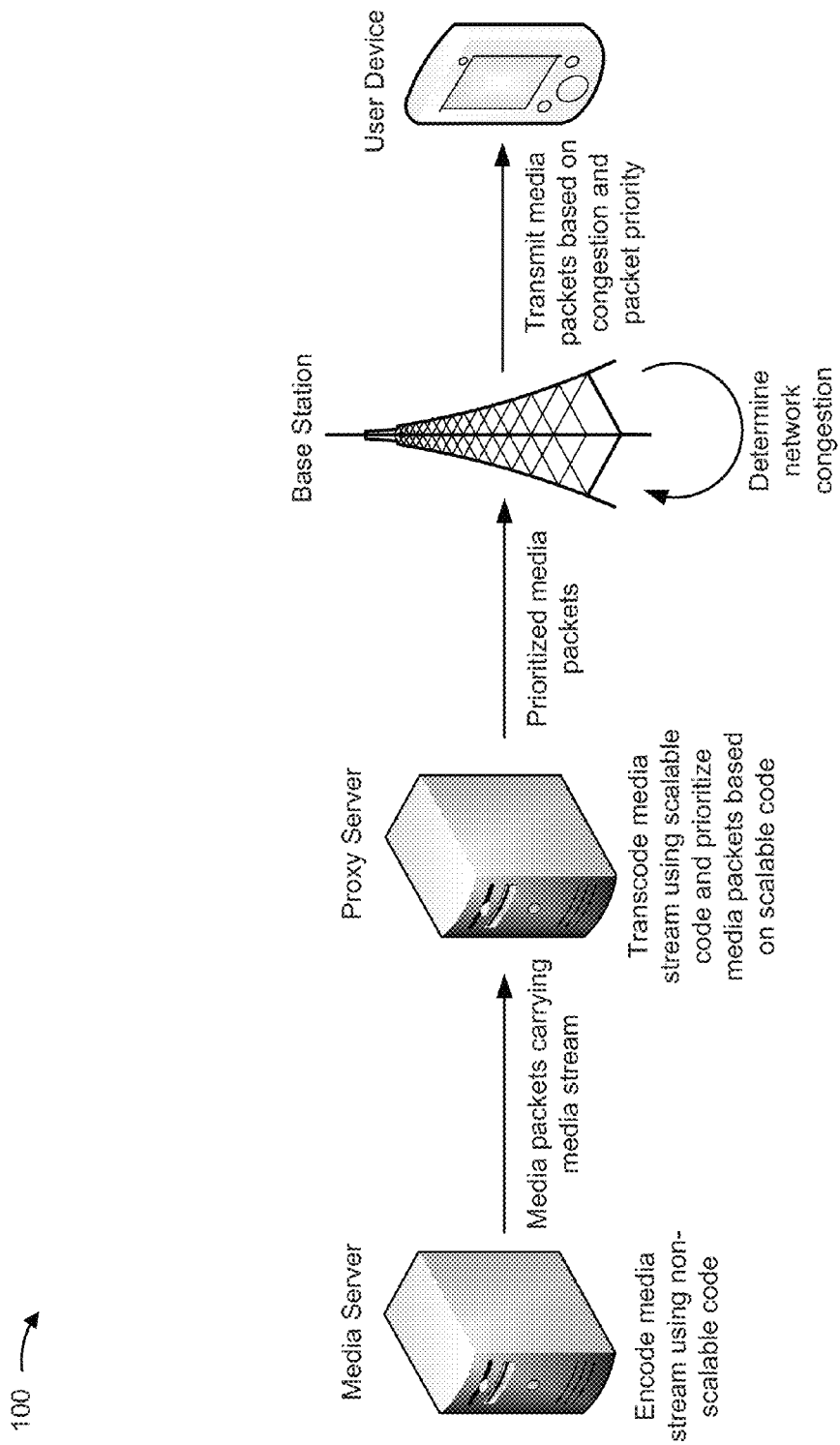
FIG. 1 is a diagram of an overview of an example implementation described herein.

FIG. 1 is a diagram of an overview of an example implementation 100 described herein. As shown in FIG. 1, example implementation 100 may include a media server, a proxy server, a base station, and a user device. In some implementations, the media server and the proxy server may be server computers, the base station may be a cellular network base station, and the user device may be a mobile phone.

As further shown in FIG. 1, the media server may encode a media stream, destined for the user device, using non-scalable code (e.g., code that does not prioritize the bits included in the media stream). The media server may package the encoded media stream into media packets, and may transmit the media packets to the proxy server. The proxy server may receive the media packets, and may transcode (e.g., decode and re-encode) the media stream using scalable code (e.g., code that prioritizes the bits included in the media stream). The proxy server may package the transcoded media stream into media packets, and may prioritize the media packets based on the scalable code (e.g., based on a priority of encoded bits carried by the media packet). Alternatively, the media server may encode the media stream using scalable code, and may prioritize the media packets based on the scalable code, without requiring transcoding by the proxy server.

The proxy server may transmit the prioritized media packets to the base station, and the base station may receive the prioritized media packets. The base station may determine network congestion (e.g., a utilization of the base station), and may transmit the media packets to the user device based on the network congestion and the priority of the media packets. For example, the base station may drop (e.g., may not transmit) low priority media packets when the network congestion is high (e.g., above a resource utilization threshold).

Figure 2:
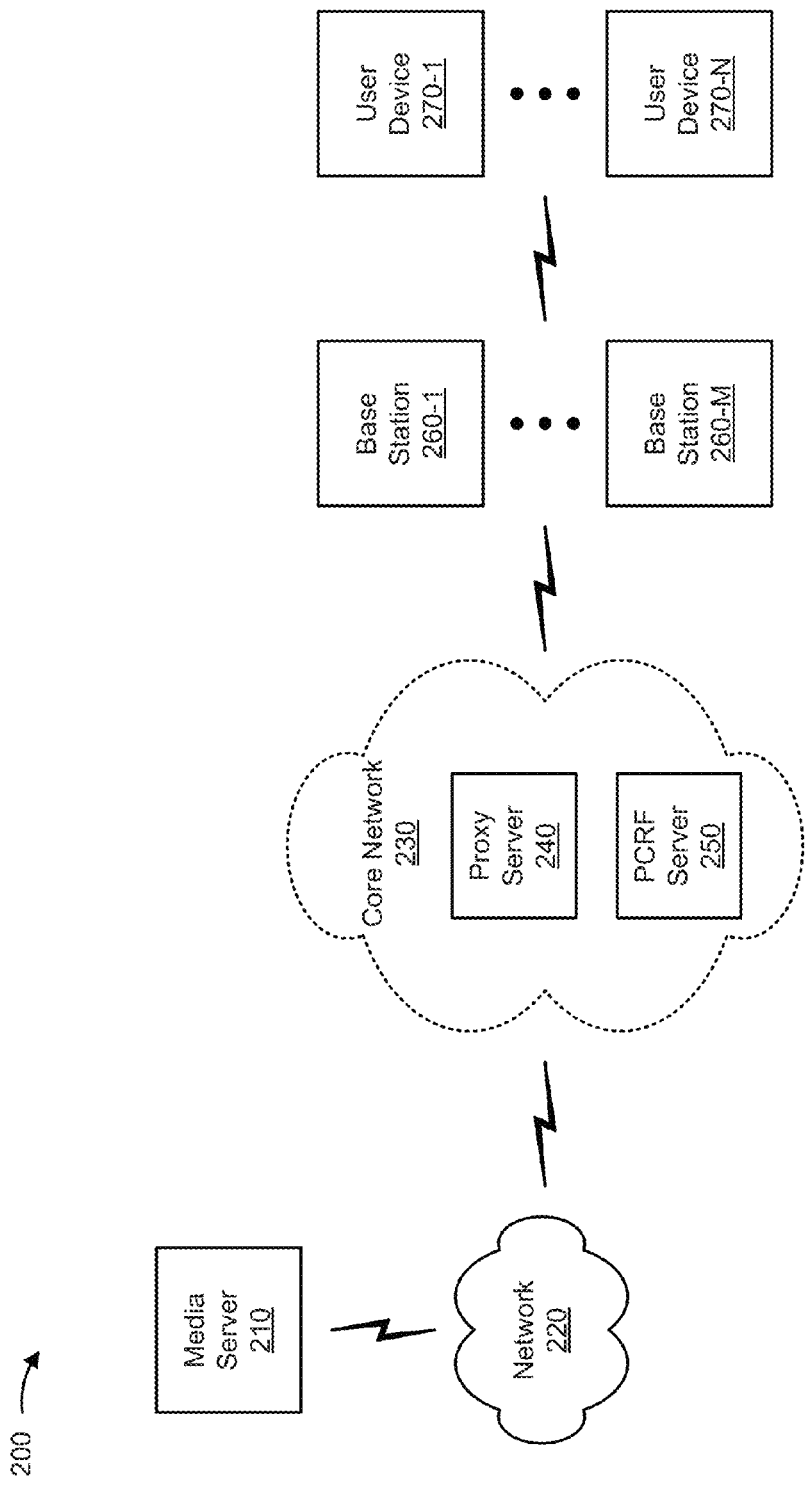
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a media server 210, a network 220, a core network 230 that includes a proxy server 240 and a policy charging and rules function ("PCRF") server 250, one or more base stations 260-1 through 260-M (M≥1) (hereinafter referred to collectively as "base stations 260," and individually as "base station 260"), and one or more user devices 270-1 through 270-N (N≥1) (hereinafter referred to collectively as "user devices 270," and individually as "user device 270").

Media server 210 may include one or more server devices, and/or other types of devices, that gather, process, search, store, and/or provide information in a manner described herein. In some implementations, media server 210 may transmit a media bitstream (e.g., media traffic) destined for user device 270. The media bitstream may include, for example, a video bitstream and/or an audio bitstream. Media server 210 may encode the media bitstream (e.g., using a scalable or non-scalable code), and may transmit the encoded media bitstream via media packets. While depicted as being separate from core network 230, media server 210 may be integrated into (and a part of) core network 230 in some implementations.

Network 220 may include one or more wired and/or wireless networks. For example, network 220 may include a cellular network, a public land mobile network ("PLMN"), a second generation ("2G") network, a third generation ("3G") network, a fourth generation ("4G") network, a fifth generation ("5G") network, a long term evolution ("LTE") network, and/or another network. Additionally, or alternatively, network 220 may include a local area network ("LAN"), a wide area network ("WAN"), a metropolitan area network ("MAN"), a telephone network (e.g., the Public Switched Telephone Network ("PSTN")), an ad hoc network, an intranet, the Internet, a fiber optic-based network, and/or a combination of these or other types of networks.

Core network 230 may include one or more wired and/or wireless networks, such as the networks discussed above in connection with network 220. In some implementations, core network 230 may include an evolved packet system ("EPS") that includes an LTE network (e.g., including base stations 260) and/or an evolved packet core ("EPC") that operates based on a third generation partnership project ("3GPP") wireless communication standard. The LTE network may be a radio access network ("RAN") that includes base stations 260 that take the form of evolved Node Bs ("eNBs") via which user devices 270 communicate with core network 230. Core network 230 may include proxy server 240, PCRF server 250, a mobility management entity device, a packet data network gateway, a serving gateway, a home subscriber server, an authentication, authorization, and accounting server, a call session control function server, and/or other devices that enable user devices 270 to communicate with network 220. In some implementations, core network 230 may include devices that perform functions of an Internet protocol ("IP") multimedia subsystem ("IMS") core.

Proxy server 240 may include one or more server devices, and/or other types of devices, that gather, process, search, store, and/or provide information in a manner described herein. In some implementations, proxy server 240 may transcode a media bitstream received from media server 210 using scalable code. Proxy server 240 may prioritize media packets carrying the media bitstream, and may transmit the prioritized media packets to base station 260.

PCRF server 250 may include one or more server devices, or other types of devices, that gather, process, search, store, and/or provide information in a manner described herein. In some implementations, PCRF server 250 may establish quality of service ("QoS") rules for a communication session based on a user classification (e.g., a quality of service level associated with a user and/or a user device 270). PCRF server 250 may receive input regarding a user classification (e.g., associated with a user device 270). PCRF server 250 may create QoS rules for the session based on the user classification, and may provide the QoS rules to base station 260, which may schedule or drop packets for transmission to user device 270 based on the QoS rules.

Base station 260 may include one or more devices that receive, process, and/or transmit traffic, such as media, audio, video, text, and/or other traffic, destined for and/or received from user device 270. In some implementations, base station 260 may be include an eNB associated with the LTE network that receives traffic from and/or sends traffic to network 220 via a packet data network gateway and/or a serving gateway. Additionally, or alternatively, one or more base stations 260 may be associated with a RAN that is not associated with the LTE network. Base station 260 may send traffic to and/or receive traffic from user device 270 via an air interface. In some implementations, base station 260 may be a small cell, such as a microcell, a picocell, and/or a femtocell.

User device 270 may include a device, such as a wired and/or wireless communication device, that is capable of communicating with other devices (e.g., devices depicted in environment 200). For example, user device 270 may include a radiotelephone, a personal communications system ("PCS") terminal (e.g., that may combine a cellular radiotelephone with data processing and data communications capabilities), a personal digital assistant ("PDA") (e.g., that can include a radiotelephone, a pager, Internet/intranet access, etc.), a smart phone, a computer (e.g., a desktop computer, a laptop computer, a tablet computer, etc.), a personal gaming system, and/or another similar type of device.

The number of devices and/or networks shown in FIG. 2 is provided for explanatory purposes. In practice, there may be additional devices and/or networks, fewer devices and/or networks, different devices and/or networks, or differently arranged devices and/or networks than those shown in FIG. 2. Furthermore, two or more of the devices shown in FIG. 2 may be implemented within a single device, or a single device shown in FIG. 2 may be implemented as multiple, distributed devices. Additionally, one or more of the devices of environment 200 may perform one or more functions described as being performed by another one or more of the devices of environment 200. Devices of environment 200 may interconnect via wired connections, wireless connections, or a combination of wired and wireless connections.

Figure 3:
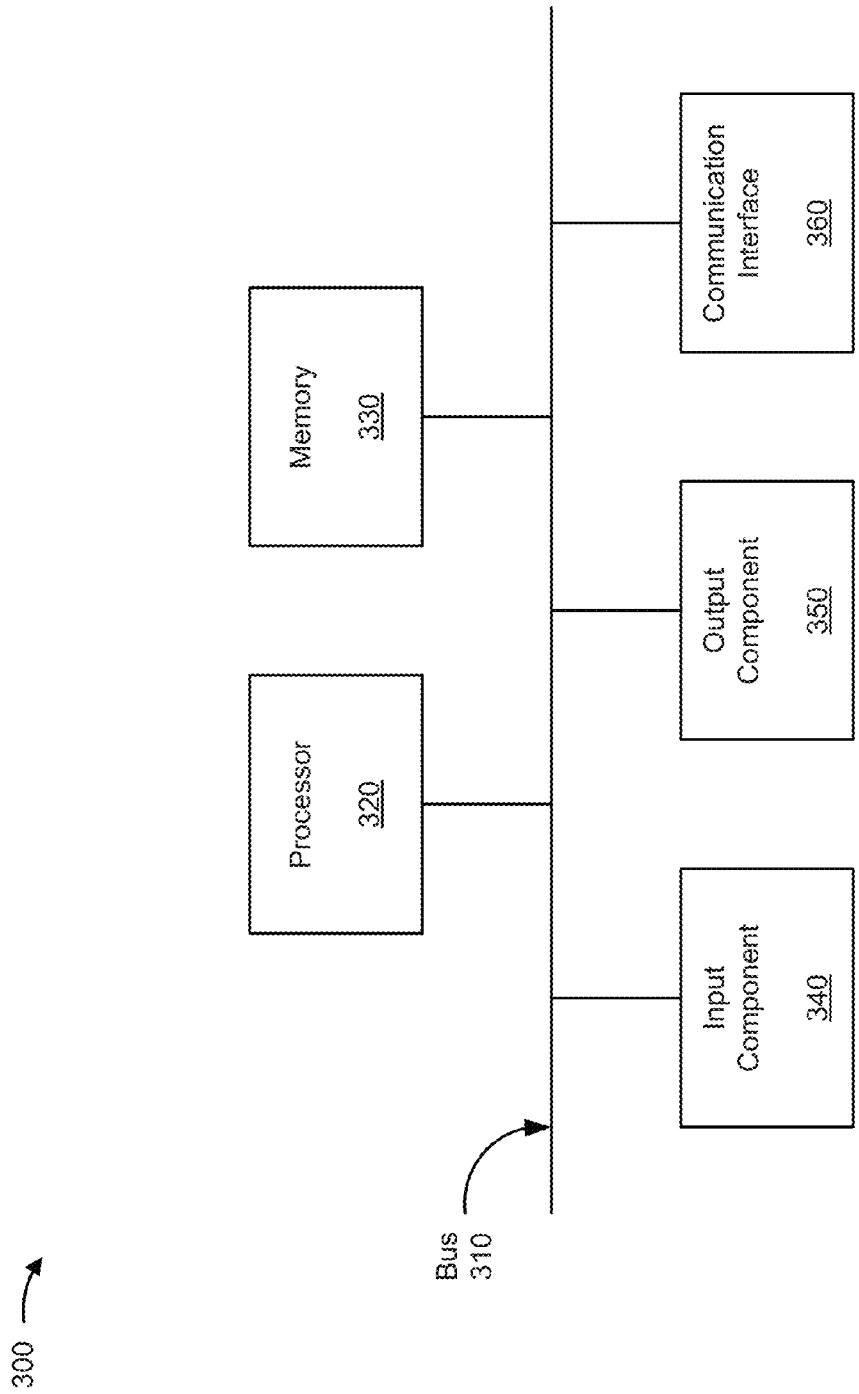
FIG. 3 is a diagram of example components of one or more devices of FIG. 2.

FIG. 3 is a diagram of example components of a device 300. Device 300 may correspond to media server 210, proxy server 240, PCRF server 250, base station 260, and/or user device 270. As illustrated in FIG. 3, device 300 may include a bus 310, a processor 320, a memory 330, an input component 340, an output component 350, and a communication interface 360.

Bus 310 may include a path that permits communication among the components of device 300. Processor 320 may include a processor (e.g., a central processing unit, a graphics processing unit, an accelerated processing unit), a microprocessor, and/or any processing logic (e.g., a field-programmable gate array ("FPGA"), an application-specific integrated circuit ("ASIC"), etc.) that interprets and/or executes instructions. In some implementations, processor 320 may include one or more processor cores. Memory 330 may include a random access memory ("RAM"), a read only memory ("ROM"), and/or any type of dynamic or static storage device (e.g., a flash, magnetic, or optical memory) that stores information and/or instructions for use by processor 320.

Input component 340 may include a component that permits a user to input information to device 300 (e.g., a keyboard, a keypad, a mouse, a button, a switch, etc.). Output component 350 may include a component that outputs information from device 300 (e.g., a display, a speaker, one or more light-emitting diodes ("LEDs"), etc.).

Communication interface 360 may include a transceiver-like component, such as a transceiver and/or a separate receiver and transmitter, that enables device 300 to communicate with other devices and/or systems, such as via a wired connection, a wireless connection, or a combination of wired and wireless connections. For example, communication interface 360 may include an Ethernet interface, an optical interface, a coaxial interface, an infrared interface, a radio frequency ("RF") interface, a universal serial bus ("USB") interface, or the like.

Device 300 may perform various operations described herein. Device 300 may perform these operations in response to processor 320 executing software instructions included in a computer-readable medium, such as memory 330. A computer-readable medium may be defined as a non-transitory memory device. A memory device may include space within a single storage device or space spread across multiple storage devices.

Software instructions may be read into memory 330 from another computer-readable medium or from another device via communication interface 360. When executed, software instructions stored in memory 330 may cause processor 320 to perform one or more processes that are described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided for explanatory purposes. In practice, device 300 may include additional components, fewer components, different components, or differently arranged components than those shown in FIG. 3. Additionally, or alternatively, each of media server 210, proxy server 240, PCRF server 250, base station 260, and/or user device 270 may include one or more devices 300 and/or one or more components of device 300.

Figure 4:
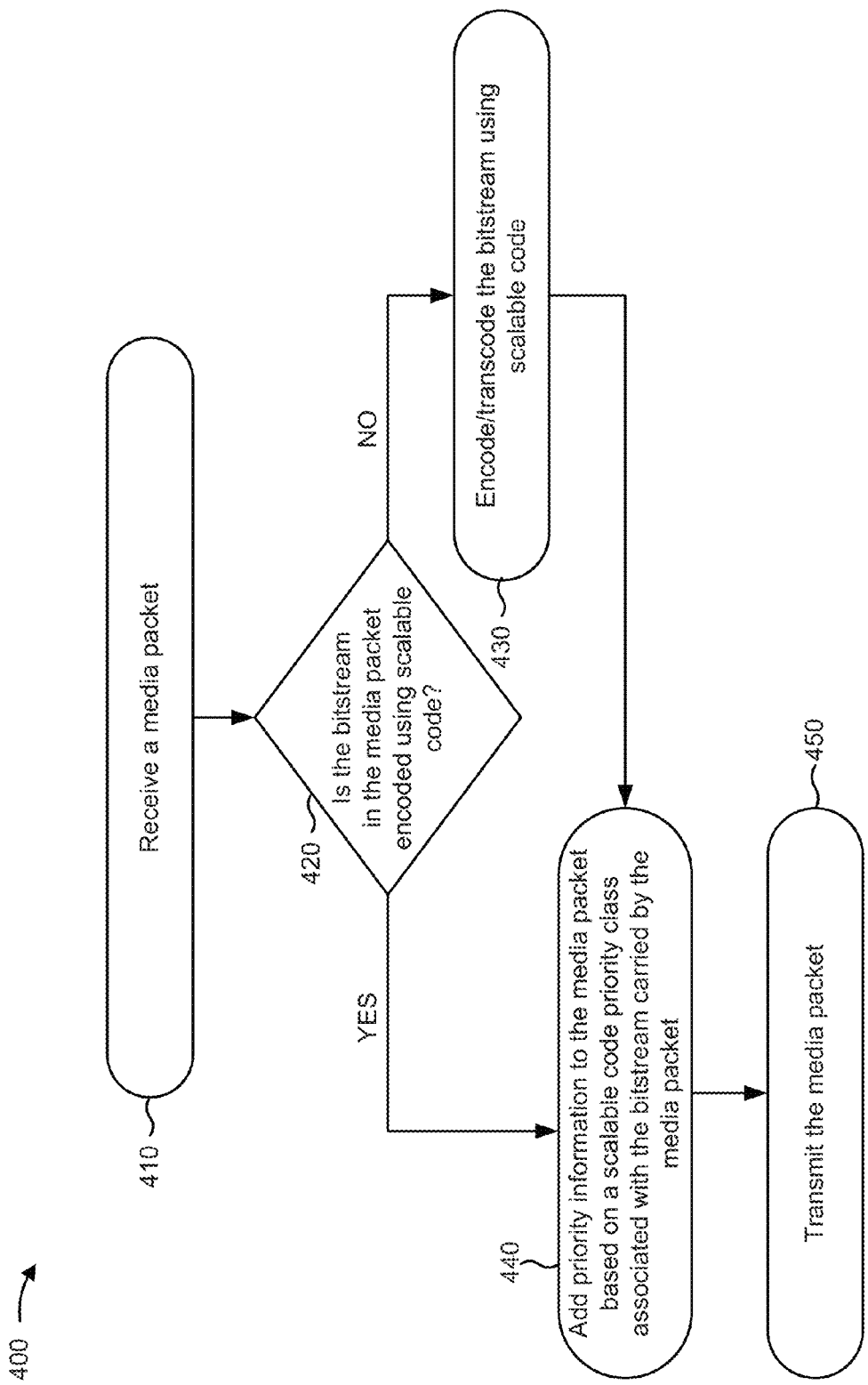
FIG. 4 is a flow chart of an example process for encoding a media bitstream and prioritizing a media packet.

FIG. 4 is a flow chart of an example process 400 for encoding a media bitstream and prioritizing a media packet. In some implementations, one or more process blocks of FIG. 4 may be performed by proxy server 240. Additionally, or alternatively, one or more process blocks of FIG. 4 may be performed by another device or a group of devices separate from or including proxy server 240.

As shown in FIG. 4, process 400 may include receiving a media packet (block 410), and determining whether the media bitstream carried by the media packet is encoded using scalable code (block 420). Proxy server 240 may receive the media packet from media server 210. In some implementations, media server 210 may encode the media bitstream using scalable code. Alternatively, media server 210 may encode the media bitstream using non-scalable code.

Scalable code refers to code that prioritizes the bits in a media bitstream. Non-scalable code refers to code that does not prioritize the bits in a media bitstream. An encoder may use code (e.g., a codec, or a coder-decoder) to encode a bitstream for transmission, storage, encryption, etc. A decoder may use the code to decode the bitstream for playback, editing, etc. For example, the code may reduce the size of the media bitstream (e.g., via compression) to achieve more effective transmission of the media represented by the bitstream.

Progressive code is a type of scalable code. An encoder that encodes a media bitstream using progressive coding places the bits in order of priority from the first bit of the bistream to the last bit of the bitstream. In a media bitstream encoded using progressive coding, the first bit in the stream sequence may have a higher priority than the second bit in the stream sequence, the second bit may have a higher priority than the third bit, bit N may have a higher priority than bit N+1, etc. Additionally, or alternatively, the first group of bits in the stream sequence may have a higher priority than the second group of bits in the stream sequence, the second group of bits may have a higher priority than the third group of bits, etc. In other words, progressive coding assigns a priority to each bit (or group of bits) in the bitstream by sequencing the bits (or group of bits) in order of priority (e.g., high priority to low priority).

Layered code is another type of scalable code. An encoder that encodes a media bitstream using layered coding associates information with each bit or group of bits that indicates a priority of the bit or group of bits. Each bit in a media bitstream encoded using layered coding may be associated with a priority from 1 (e.g., highest) to X (e.g., lowest), with $X \geq 1$. For example, a high priority layer may include a base layer that includes bits that carry header information, motion vector information, video low frequency coefficients, and/or information required to play the media. A low priority layer may include an enhancement layer that includes bits that carry information that enhances the media quality. When all of the bits of the bitstream are decoded (e.g., the base layer and the enhancement layer), the media may be of higher quality than if not all of the bits are decoded (e.g., only the base layer).

In some implementations, proxy server 240 may determine whether the media bitstream is encoded using progressive code, layered code, or another type of scalable code. For example, proxy server 240 may analyze the media bitstream and/or the media packet to determine whether bits and/or packets have been prioritized by scalable code.

As further shown in FIG. 4, if proxy server 240 determines that the media bitstream carried by the media packet is not encoded using scalable code (block 420—NO), then process 400 may include encoding or transcoding the media bitstream using scalable code (block 430). For example, proxy server 240 may determine that the media bitstream, received from media server 210, is not encoded using scalable code. In some implementations, proxy server 240 may make this determination based on whether bits in the media bitstream (and/or packets carrying the bits) are associated with a priority (e.g., as a result of being encoded using scalable code). Additionally, or alternatively, proxy server 240 may make the determination based on code (e.g., a codec) used to encode and/or decode the media bitstream (e.g., whether the code is scalable code). Based on the determination, proxy server 240 may encode or transcode the media bitstream using scalable code, such as progressive code or layered code. Transcoding refers to decoding the media bitstream using one type of code (e.g., non-scalable code), and re-encoding the media bitstream using another type of code (e.g., scalable code).

As further shown in FIG. 4, if proxy server 240 determines that the media bitstream carried by the media packet is encoded using scalable code (block 420—YES), then process 400 may include adding priority information to the media packet based on a scalable code priority class associated with the media bitstream carried by the media packet (block 440). Similarly, proxy server 240 may add the priority information to the media packet after encoding or transcoding the media bitstream using scalable code. For example, proxy server 240 may determine that the media bitstream, received from media server 210, is encoded using scalable code (or proxy server 240 may encode the media bitstream using scalable code).

Proxy server 240 and/or media server 210 may add priority information to the media packet based on a scalable code priority class associated with the media bitstream carried by the media packet. A scalable code priority class refers to a priority assigned to a bit in the media bitstream using the scalable code. For progressive coding, where each bit has a higher priority than the next bit, each bit may have a different priority class. Alternatively, proxy server 240 may receive input (e.g., from a user and/or a device) that instructs proxy server 240 to divide the bitstream into Y priority classes ($Y \geq 1$), where the bits in each priority class have a different priority. For layered coding, where each bit is assigned a priority, the priority classes may correspond to the priority assigned to the bit.

Proxy server 240 may determine which bits to include in a media packet based on the priority class of the bits. In some implementations, proxy server 240 may include bits of a single priority class in a media packet, and may add priority information, to the media packet, that identifies the single priority class. Alternatively, proxy server 240 may include bits of multiple priority classes in a media packet. In this implementation, proxy server 240 may add priority information, to the media packet, that identifies a priority class of the majority of bits included in the media packet. Alternatively, proxy server 240 may add priority information, to the media packet, that identifies an average priority class of the bits included in the media packet.

Proxy server 240 may add priority information to the media packet by modifying a packet header of the media packet. A packet header refers to information placed at the beginning of the packet. In some implementations, proxy server 240 may add the priority information to the end of the media packet or at any other position in the media packet.

In some implementations, the priority information may be added using a differentiated services code point (DSCP) value to classify and/or prioritize the media packet. The DSCP may be included in a differentiated services field of the packet header. Additionally, or alternatively, the priority information may be added using an assured forwarding (AF) value to classify and/or prioritize the media packet. A media packet classified using a higher DSCP or AF value indicates that the media packet has a higher priority than a media packet classified using a lower DSCP or AF value.

As further shown in FIG. 4, process 400 may include transmitting the media packet (block 450). In some implementations, proxy server 240 may transmit the media packet, with the priority information, to base station 260.

While a series of blocks has been described with regard to FIG. 4, the blocks and/or the order of the blocks may be modified in some implementations. Additionally, or alternatively, non-dependent blocks may be performed in parallel.

Figure 5:
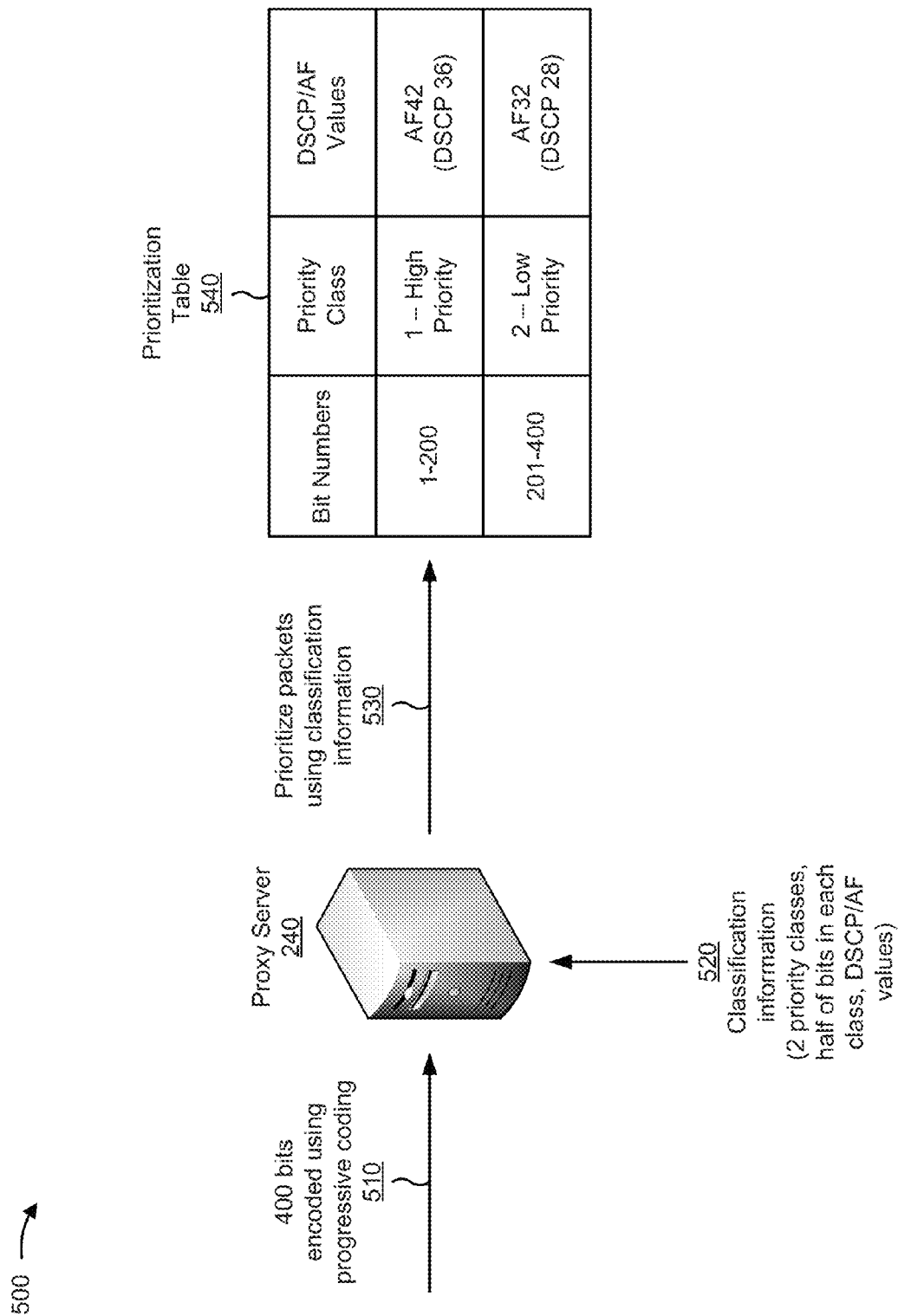
FIG. 5 is a diagram of an example implementation relating to the process shown in FIG. 4.

FIG. 5 is a diagram of an example implementation 500 relating to the process shown in FIG. 4. FIG. 5 shows an implementation 500 of adding priority information to a media packet carrying a media bitstream encoded using progressive coding.

As shown by reference number 510, proxy server 240 may receive a packet carrying a media bitstream encoded using progressive coding. For example, assume that proxy server 240 receives four hundred (400) bits encoded using progressive coding.

As shown by reference number 520, proxy server 240 may also receive classification information. The classification information may indicate a quantity of priority classes in which the received media packet and/or bitstream is to be classified by proxy server 240. In some implementations, the progressive code may classify the bits into more or fewer priority classes than proxy server 240. The classification information may specify how the bits will be assigned to priority classes by proxy server 240, based on the priority assigned to the bits by the progressive code.

Additionally, or alternatively, the classification information may include DSCP or AF values (e.g., a priority level) that proxy server 240 is to add to the packet headers of the media packets. For example, proxy server 240 may receive classification information that indicates that the four hundred (400) bits are to be classified into two (2) priority classes (e.g., high priority and low priority), with half of the four hundred bits (e.g., two hundred bits) in each priority class. Additionally, proxy server 240 may receive classification information that identifies DSCP or AF values for the two priority classes (e.g., AF 42 and/or DSCP 36 for the high priority class, AF 32 and/or DSCP 28 for the low priority class).

As shown by reference number 530, proxy server 240 may prioritize the media packets using the classification information. For example, proxy server 240 may prioritize the media packets as shown by prioritization table 540. Prioritization table 540 shows that proxy server 240 has classified bits one through two hundred (1-200) into a high priority class (e.g., class 1—high priority), and has added an AF value of 42 and/or a DSCP value of 36 to the packet header of the media packets carrying bits 1-200. Prioritization table 540 also shows that proxy server 240 has classified bits two hundred one through four hundred (201-400) into a low priority class (e.g., class 2—low priority), and has added an AF value of 32 and/or a DSCP value of 28 to the packet header of the media packets carrying bits 201-400.

The information shown in FIG. 5, such as the quantity of bits, the quantity and type of priority classes, the DSCP/AF values, and the classification information, is provided as an example. In practice, some implementations may include additional information, less information, or different information than shown in FIG. 5.

Figure 6:
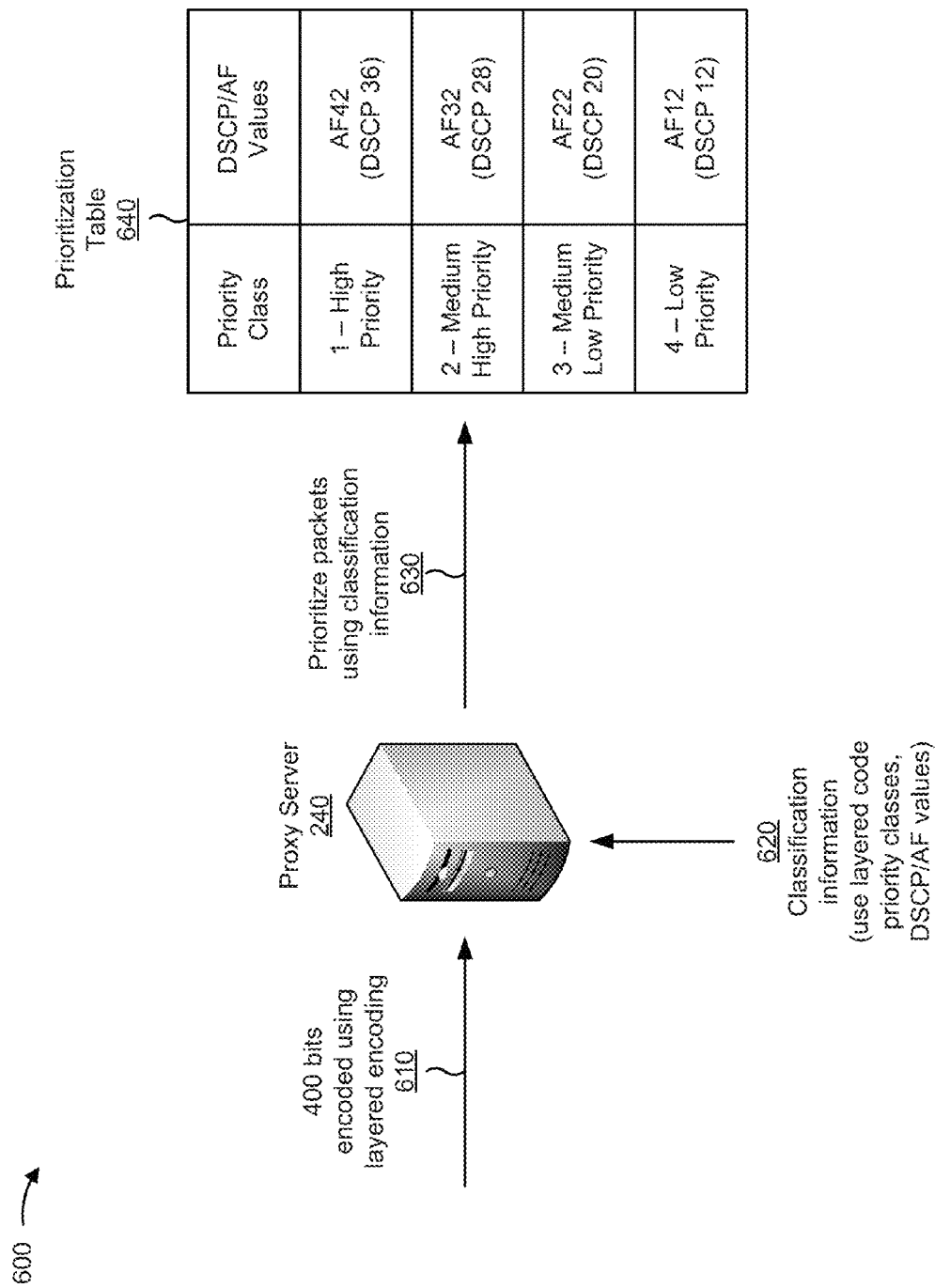
FIG. 6 is a diagram of another example implementation relating to the process shown in FIG. 4.

FIG. 6 is a diagram of another example implementation 600 relating to the process shown in FIG. 4. FIG. 6 shows an implementation 600 of adding priority information to a media packet carrying a media bitstream encoded using layered coding.

As shown by reference number 610, proxy server 240 may receive a media bitstream encoded using layered coding. For example, assume that proxy server 240 receives four hundred (400) bits encoded using layered coding.

As shown by reference number 620, proxy server 240 may also receive classification information, which may include the information described above in connection with FIG. 5. Additionally, or alternatively, the classification information may indicate that proxy server 240 is to classify the media bitstream into a quantity of priority classes defined by the layered code used to encode the media bitstream. For example, in example implementation 600, the layered code may separate the media bitstream into four priority classes. In some implementations, the layered code may classify the bits into more or fewer priority classes than proxy server 240. The classification information may specify how the bits will be assigned to priority classes by proxy server 240, based on the priority assigned to the bits by the layered code.

As shown by reference number 630, proxy server 240 may prioritize the media packets using the classification information. For example, proxy server 240 may prioritize the media packets as shown by prioritization table 640. Prioritization table 640 shows that proxy server 240 has classified the bits into four priority classes: 1—high priority; 2—medium-high priority; 3—medium-low priority; and 4—low priority. Prioritization table 640 also shows that proxy server 240 has added an AF value of 42 and/or a DSCP value of 36 to the packet header of the media packets carrying the high priority bits (class 1), has added an AF value of 32 and/or a DSCP value of 28 to the packet header of the media packets carrying the medium-high priority bits (class 2), has added an AF value of 22 and/or a DSCP value of 20 to the packet header of the media packets carrying the medium-low priority bits (class 3), and has added an AF value of 12 and/or a DSCP value of 12 to the packet header of the media packets carrying the low priority bits (class 4).

In some implementations, prioritization table 640 may identify bit numbers assigned to each priority class, as shown in prioritization table 540. Alternatively, prioritization table 640 may not identify bit numbers assigned to each priority class, because each bit may already be prioritized by the layered code.

The information shown in FIG. 6, such as the quantity of bits, the quantity and type of priority classes, the DSCP/AF values, and the classification information, is provided as an example. In practice, some implementations may include additional information, less information, or different information than shown in FIG. 6.

Figure 7:
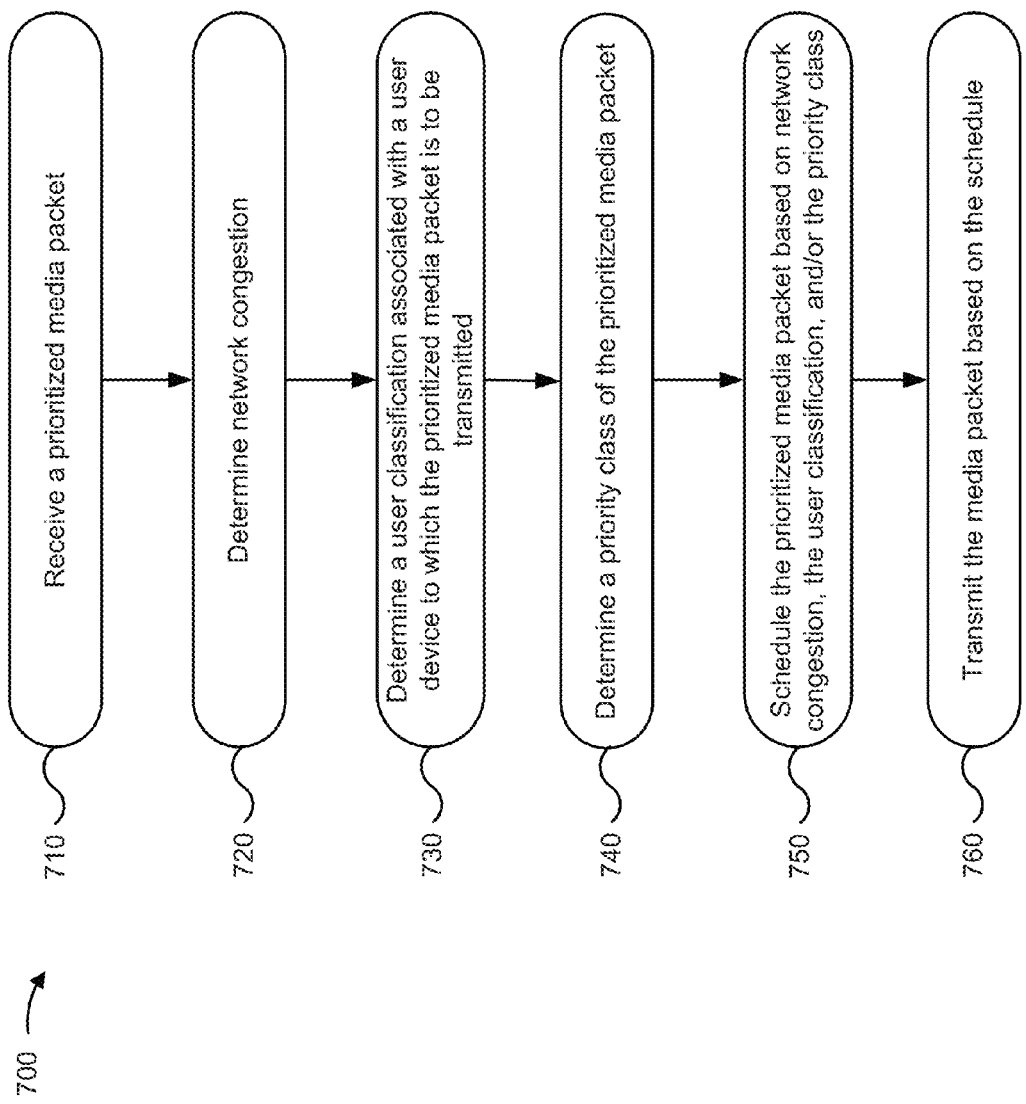
FIG. 7 is a flow chart of an example process for scheduling media packets for transmission.

FIG. 7 is a flow chart of an example process 700 for scheduling media packets for transmission. In some implementations, one or more process blocks of FIG. 7 may be performed by base station 260. Additionally, or alternatively, one or more process blocks of FIG. 7 may be performed by another device or a group of devices separate from or including base station 260.

As shown in FIG. 7, process 700 may include receiving a prioritized media packet (block 710). In some implementations, base station 260 may received the prioritized media packet from proxy server 240.

As further shown in FIG. 7, process 700 may include determining network congestion (block 720). In some implementations, base station 260 may determine network congestion by determining an indicator of network congestion, such as a utilization of base station 260. For example, base station 260 may assign physical resource blocks (PRBs) to transmit media packets. Base station 260 may determine the utilization of base station 260 using an indicator, such as a radio resource utilization indicator (RRUI). The RRUI value may equal the ratio of the quantity of assigned physical resource blocks to the total quantity of physical resource blocks. In other words, the RRUI value may equal or be based on the percentage of assigned physical resource blocks in base station 260. For example, base station 260 may calculate RRUI as follows:

$$RRUI = \text{number of assigned PRBs/total number of PRBs}.$$

In some implementations, base station 260 may determine the utilization based on a quantity and/or percentage of unassigned PRBs. For example, base station 260 may utilization as follows:

$$\text{Utilization} = \text{number of unassigned PRBs/total number of PRBs}.$$

Base station 260 may use any combination of assigned PRBs, unassigned PRBs, and total PRBs to determine the utilization of base station 260. Base station 260 may calculate the indicator value and/or an average of the indicator value over a particular time period, which may be adjusted by an operator.

As further shown in FIG. 7, process 700 may include determining a user classification associated with a user device to which the prioritized media packet is to be transmitted (block 730). In some implementations, base station 260 may receive the user classification from PCRF server 250. The user classification may include a subscription level (e.g., gold, silver, bronze, etc.) associated with a user of user device 270 and/or a quality of service level associated with a user of user device 270.

As further shown in FIG. 7, process 700 may include determining a priority class of the prioritized media packet (block 740). In some implementations, base station 260 may determine the priority class based on priority information associated with the media packet. For example, base station 260 may determine the priority class based on the DSCP and/or AF value in the packet header of the media packet.

As further shown in FIG. 7, process 700 may include scheduling the prioritized media packet based on the network congestion, the user classification, and/or the priority class (block 750). In some implementations, base station 260 may schedule the media packet (e.g., may place the media packet in particular queue and/or queue position, may drop the packet, etc.) based on the network congestion (e.g., the RRUI value), the user classification (e.g., the subscription level), and/or the priority class of the media packet.

When scheduling the media packet based on the network congestion, base station 260 may compare the RRUI value, or another indicator of network congestion and/or base station utilization, to a threshold value. Base station 260 may prioritize and/or drop particular media packets based on the RRUI value satisfying a threshold (e.g., being greater than a threshold value). For example, base station 260 may drop packets classified in a particular priority class (e.g., low priority) based on the RRUI value satisfying a threshold value. In some implementations, base station 260 may receive the threshold value from a user and/or a device.

When scheduling the media packet based on the user classification, base station 260 may prioritize and/or drop particular media packets based on the user classification. For example, base station 260 may prioritize packets to be transmitted to a user with a high subscription level (e.g., gold), as compared to packets to be transmitted to a user with a low subscription level (e.g., bronze). Additionally, or alternatively, base station 260 may drop packets to be transmitted to a user with a low subscription level (e.g., bronze). In some implementations, base station 260 may drop packets for a user with a low subscription level based on the network congestion (e.g., the RRUI value) satisfying a threshold.

When scheduling the media packet based on the priority class, base station 260 may prioritize and/or drop particular media packets based on the priority class. For example, base station 260 may prioritize packets in a high priority class and/or may drop packets in a low priority class. In some implementations, base station 260 may drop packets in a low priority class based on the network congestion (e.g., the RRUI value) satisfying a threshold.

As further shown in FIG. 7, process 700 may include transmitting the media packet based on the schedule (block 760). In some implementations, the schedule may indicate packets to be prioritized, and the prioritized packets may be transmitted, by base station 260 to user device 270, before other packets (e.g., non-prioritized packets). Additionally, or alternatively, the schedule may indicate packets to be dropped, and base station 260 may drop these packets (e.g., by not transmitting these packets to user device 270).

While a series of blocks has been described with regard to FIG. 7, the blocks and/or the order of the blocks may be modified in some implementations. Additionally, or alternatively, non-dependent blocks may be performed in parallel.

Figure 8:
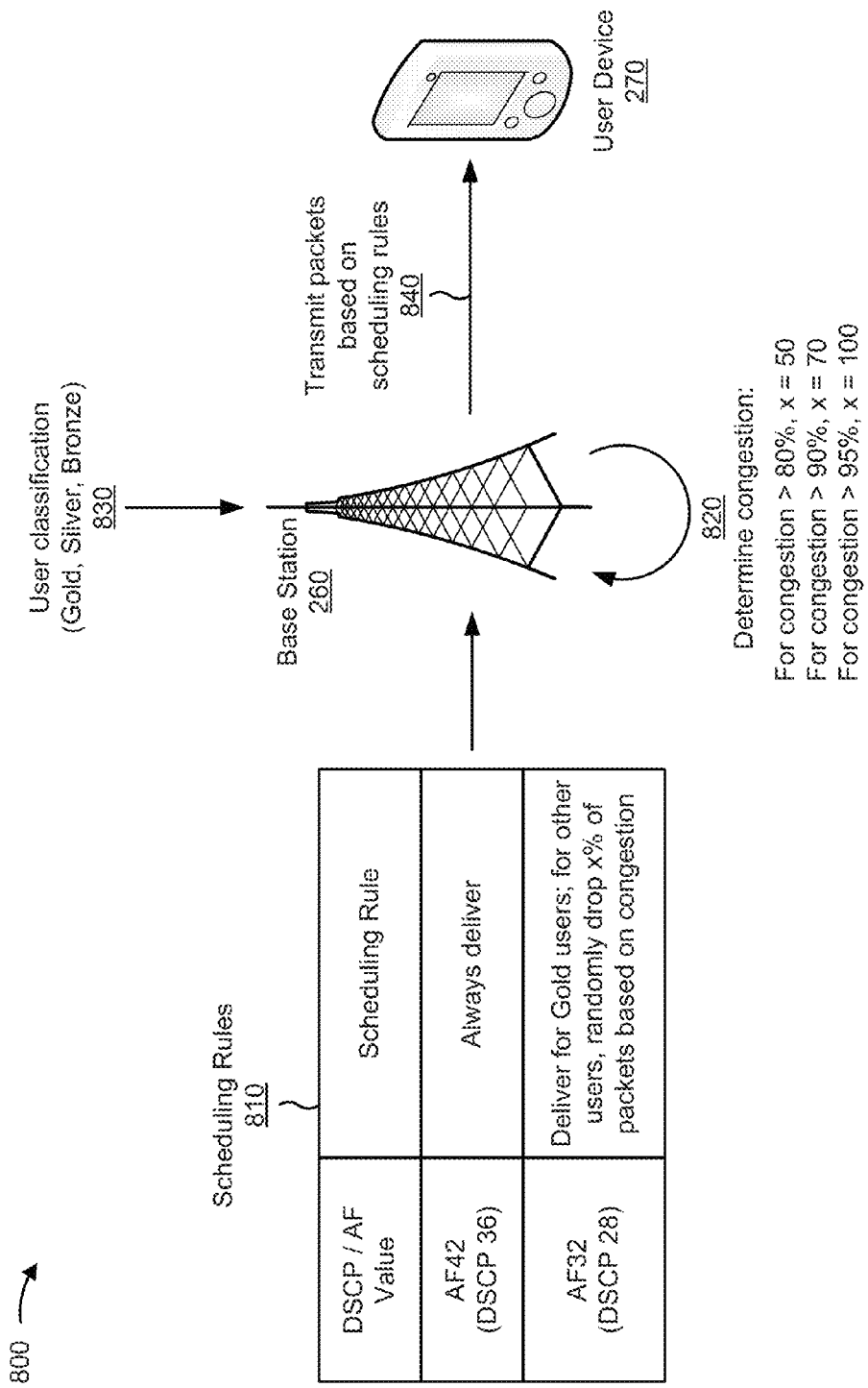
FIG. 8 is a diagram of an example implementation relating to the process shown in FIG. 7.

FIG. 8 is a diagram of an example implementation 800 relating to the process shown in FIG. 7. FIG. 8 shows an implementation 800 of transmitting media packets, from base station 260 to user device 270, based on scheduling rules 810.

As shown in FIG. 8, base station 260 may receive scheduling rules 810 (e.g., from another device, such as PCRF server 250). Scheduling rules 810 may specify how media packets should be scheduled (e.g., prioritized and/or dropped) based on network congestion, user classification, and/or a priority class of the media packet. For example, scheduling rules 810 may specify that media packets with an AF value of 42 and/or a DSCP value of 36 in the packet header should always be delivered (or transmitted) by base station 260. Scheduling rules 810 may further specify that media packets with an AF value of 32 and/or a DSCP value of 28 in the packet header should be delivered for gold users, while x % of the packets should be randomly dropped for non-gold users, where x depends on the level of network congestion.

As shown by reference number 820, base station 260 may determine network congestion, and may use the network congestion to apply scheduling rules 810 to received media packets. In example implementation 800, base station 260 may set the value of x equal to 50 when the congestion (e.g., a congestion indicator, such as the RRUI value) is greater than 80%, may set the value of x equal to 70 when the congestion is greater than 90%, and may set the value of x equal to 100 when the congestion is greater than 95%. Returning to the scheduling rules 810, when the congestion level is greater than 80%, base station 260 may randomly drop 50% of the media packets with an AF value of 32 and/or a DSCP value of 28 for non-gold users. Similarly, when the congestion level is greater than 90%, base station 260 may randomly drop 70% of the media packets with an AF value of 32 and/or a DSCP value of 28 for non-gold users. Finally, when the congestion level is greater than 95%, base station 260 may drop 100% (e.g. all) of the media packets with an AF value of 32 and/or a DSCP value of 28 for non-gold users.

As shown by reference number 830, base station 260 may receive the user classification (e.g., gold, silver, bronze) from a user and/or another device (e.g., PCRF server 250), and may use the user classification to apply scheduling rules 810 to received media packets.

As shown by reference number 840, base station 260 may transmit the media packets, to user device 270, based on scheduling rules 810 (and based on the priority class, the user classification, and the network congestion). For example, base station 260 may prioritize transmission of a packet (e.g., may transmit the packet before another packet) based on the scheduling rules. Additionally, or alternatively, base station 260 may drop a packet (e.g., may not transmit a packet) based on the scheduling rules.

The information shown in FIG. 8, such as the priority classes, the scheduling rules, the user classifications, the DSCP/AF values, and the network congestion parameters, is provided as an example. In practice, some implementations may include additional information, less information, or different information than shown in FIG. 8.

Figure 9:
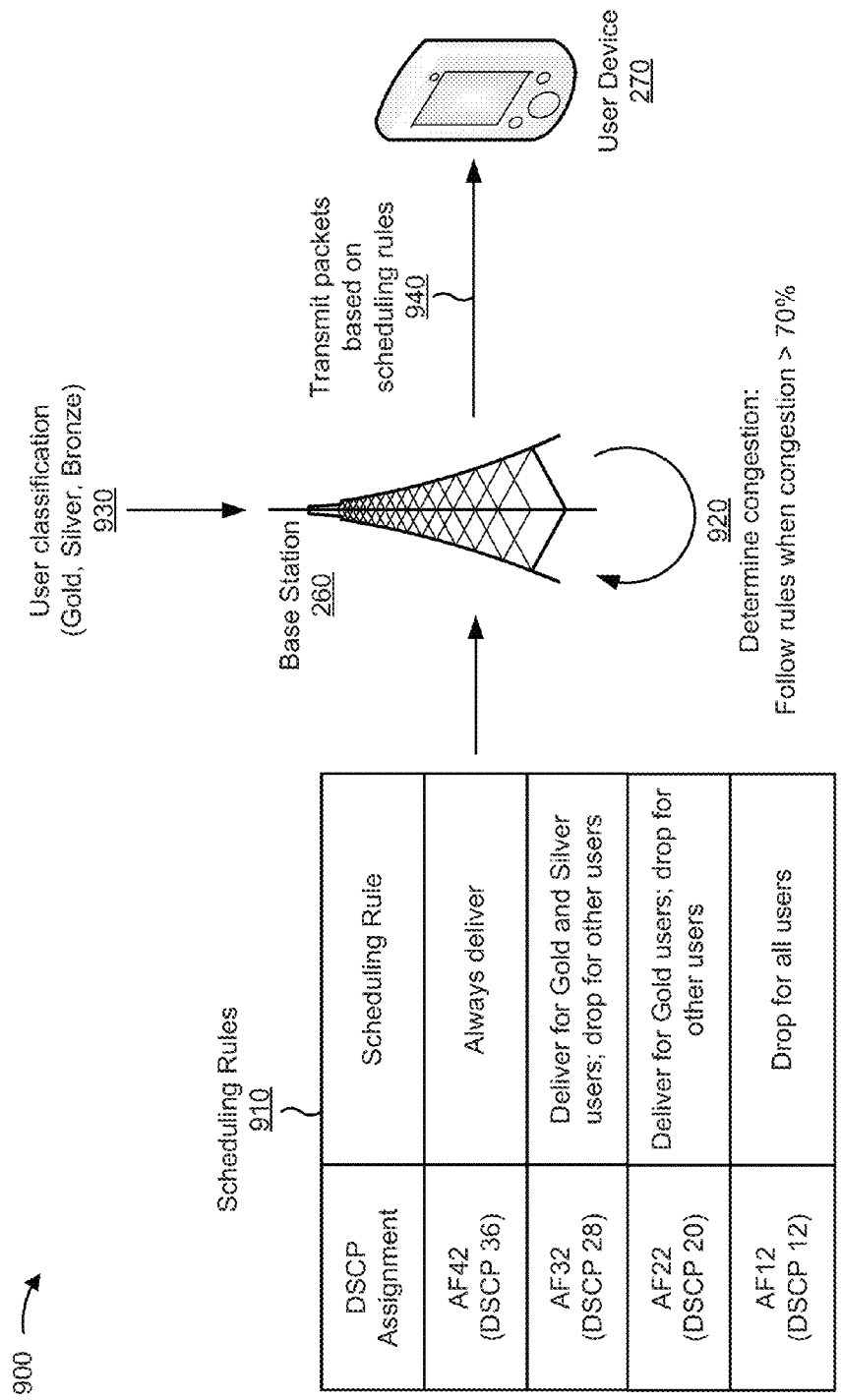
FIG. 9 is a diagram of another example implementation relating to the process shown in FIG. 7.

FIG. 9 is a diagram of an example implementation 900 relating to the process shown in FIG. 7. FIG. 9 shows an implementation 900 of transmitting media packets, from base station 260 to user device 270, based on scheduling rules 910.

As shown in FIG. 9, base station 260 may receive scheduling rules 910, as discussed above in connection with FIG. 8. For example, scheduling rules 910 may specify that media packets with an AF value of 42 and/or a DSCP value of 36 in the packet header should always be delivered (or transmitted) by base station 260. Scheduling rules 910 may further specify that media packets with an AF value of 32 and/or a DSCP value of 28 in the packet header should be delivered for gold and silver users, and dropped for other (non-gold and non-silver) users. Scheduling rules 910 may further specify that media packets with an AF value of 22 and/or a DSCP value of 20 in the packet header should be delivered for gold users, and dropped for other (non-gold) users. Finally, scheduling rules 910 may specify that media packets with an AF value of 12 and/or a DSCP value of 12 in the packet header should be dropped for all users.

As shown by reference number 920, base station 260 may determine network congestion, and may use the network congestion to apply scheduling rules 910 to received media packets. For example, scheduling rules 910 may only be applied when network congestion at base station 260 (e.g., as indicated by the RRUI value) exceeds 70%. When the network congestion does not exceed 70%, base station 260 may ignore scheduling rules 910 (e.g., may schedule packets based on a different scheduling policy).

As shown by reference number 930, base station 260 may receive the user classification, as discussed above in connection with FIG. 8.

As shown by reference number 940, base station 260 may transmit the media packets, to user device 270, based on scheduling rules 910, as discussed above in connection with FIG. 8.

The information shown in FIG. 9, such as the priority classes, the scheduling rules, the user classifications, the DSCP/AF values, and the network congestion parameters, is provided as an example. In practice, some implementations may include additional information, less information, or different information than shown in FIG. 9.

Implementations described herein may reduce congestion in content delivery networks by prioritizing media packets for delivery to user devices, and by dropping low priority packets. Devices in the network may prioritize the packets based on network congestion, a user classification, and/or a priority used by a scalable coder when encoding the bits of a media stream.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term "component" is intended to be broadly construed as hardware, firmware, or a combination of hardware and software.

Some implementations are described herein in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "satisfying" a threshold (or similar terms) may be used interchangeably with "being greater than a threshold," "being greater than or equal to a threshold," "being less than a threshold," "being less than or equal to a threshold," or other similar terms.

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and control hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:

1. A device, comprising:
   one or more processors to:
      receive a packet that includes priority information that is based on a priority assigned to a plurality of bits included in the packet,
         the priority being assigned based on scalable code used to encode the plurality of bits for transmission;
      determine a percentage of physical resource blocks assigned to transmit scheduled packets out of a total quantity of physical resource blocks;
      determine an indicator of network congestion based on the percentage;
      determine that the indicator satisfies a threshold; and
      schedule the packet for transmission to a user device based on the priority information and based on determining that the indicator satisfies the threshold.

2. The device of claim 1, where the scalable code includes layered code that assigns the priority to each of the plurality of bits.

3. The device of claim 1, where the scalable code includes progressive code that assigns the priority to each of the plurality of bits by sequencing the plurality of bits in order of priority.

4. The device of claim 1, where the priority information includes a differentiated services code point (DSCP) value or an assured forwarding (AF) value included in the packet.

5. The device of claim 1,
   where the one or more processors are further to:
      receive a user classification that specifies a subscription level for a user associated with the user device; and
   where the one or more processors, when scheduling the packet for transmission, are further to:
      schedule the packet for transmission based on the user classification.

6. The device of claim 1, where the one or more processors, when scheduling the packet for transmission, are further to at least one of:
   prioritize the packet for transmission; or
   drop the packet.

7. A method, comprising:
   receiving, by a device, a packet that includes priority information based on a priority assigned to one or more bits included in the packet,
      the priority being assigned based on scalable code used to encode the one or more bits for transmission;
   determining, by the device, that an indicator of network congestion satisfies a threshold,
      the indicator of network congestion including a percentage of physical resource blocks assigned to transmit scheduled packets; and
   scheduling, by the device, the packet for transmission to a user device based on the priority information and based on determining that the indicator satisfies the threshold.

8. The method of claim 7, where the scalable code includes layered code that assigns the priority to the one or more bits.

9. The method of claim 7,
   where the scalable code includes progressive code that assigns the priority to the one or more bits by placing the one or more bits in a sequence, and
   where the position in the sequence indicates the priority of the one or more bits.

10. The method of claim 7, where the priority information includes a differentiated services code point (DSCP) value or an assured forwarding (AF) value included in the packet.

11. The method of claim 7, further comprising:
    receiving a user classification that specifies a quality of service level for a user associated with the user device,
       where scheduling the packet for transmission comprises:
          scheduling the packet for transmission based on the user classification.

12. The method of claim 7, where scheduling the packet for transmission further comprises at least one of:
    prioritizing the packet for transmission; or
    dropping the packet.

13. The method of claim 7, further comprising:
    receiving rules for scheduling from a policy charging and rules function (PCRF) server,
       where scheduling the packet comprises:
          scheduling the packet based on the priority information, based on determining that the indicator satisfies the threshold, and based on the rules.

14. A non-transitory computer-readable medium storing instructions, the instructions comprising:
    one or more instructions that, when executed by a processor, cause the processor to:
       receive a packet that includes priority information that is based on a priority assigned to each of a plurality of bits included in the packet,
          the priority being assigned based on scalable code used to encode the plurality of bits for transmission;
       determine a quantity of physical resource blocks assigned to transmit scheduled packets;
       determine a total quantity of physical resource blocks;
       determine an indicator of network congestion based on the quantity and the total quantity;
       determine that the indicator of network congestion satisfies a threshold; and
       schedule the packet for transmission to a user device based on the priority information and based on determining that the indicator satisfies the threshold.

15. The non-transitory computer-readable medium of claim 14, where the scalable code includes layered code that assigns the priority to each of the plurality of bits.

16. The non-transitory computer-readable medium of claim 14, where the priority information includes a differentiated services code point (DSCP) value or an assured forwarding (AF) value included in the packet.

17. The non-transitory computer-readable medium of claim 14, where the one or more instructions, to schedule the packet for transmission comprise:
    one or more instructions that, when executed by the processor, cause the processor to at least one of:
       prioritize the packet for transmission; or
       drop the packet.

18. The non-transitory computer-readable medium of claim 14, where the scalable code includes progressive code that assigns the priority to each of the plurality of bits by sequencing each of the plurality of bits in order of priority.

19. The non-transitory computer-readable medium of claim 14,
where the instructions further comprise:
one or more instructions that, when executed by the processor, cause the processor to:
receive a user classification associated with the user device; and
where the one or more instructions to schedule the packet for transmission comprise:
one or more instructions that, when executed by the processor, cause the processor to:
schedule the packet for transmission based on the priority information, based on the user classification, and based on determining that the indicator satisfies the threshold.

20. The non-transitory computer-readable medium of claim 19, where the user classification comprises one or more of:
a subscription level associated with a user of the user device, or
a quality of service level associated with the user of the user device.

\* \* \* \* \*